Sept. 14, 1943.  R. W. THOMAS  2,329,363
ADAPTER MEANS FOR FLUID SYSTEMS
Filed June 21, 1940   2 Sheets-Sheet 2

INVENTOR
ROSSWELL W. THOMAS
BY
ATTORNEY

Patented Sept. 14, 1943

2,329,363

UNITED STATES PATENT OFFICE 2,329,363

ADAPTER MEANS FOR FLUID SYSTEMS

Rosswell W. Thomas, Birmingham, Mich., assignor to Phillips Petroleum Company, a corporation of Delaware Application June 21, 1940, Serial No. 341,775

5 Claims. (Cl. 62—1)

This invention relates to a system for dispensing high pressure fluids; more particularly, it relates to an adapter for use with such a system.

Many and various fluids for home and industrial uses are being extensively marketed at the present time in suitable containers in which the fluid is confined under superatmospheric pressure. Often these fluids, which may be in either a gaseous or liquid state in the containers, are to be used in the gaseous state and usually the pressure must be reduced prior to their use. Fuel gases, such as propane, butane, or a mixture of the two, are marketed as liquefied gases which are vaporized before being used as fuel. Various types of containers have been devised for storing and transporting these fluids, and various types of pressure reducing equipment has been used in conjunction with these containers. My invention provides a means whereby a container having a conventional hand operated outlet valve may be used in conjunction with a pressure regulator of the type disclosed in the pending application of Kenneth R. Lewis, Serial No. 201,581, filed April 12, 1938.

One of the objects of this invention is to provide an adapter for use in a fluid distributing system.

Another object of this invention is to provide means whereby a pressure regulator of one manufacturer may be adapted for use with a container of different manufacture.

A further object of this invention is to provide an adapter containing a regulator valve.

A still further object of this invention is to provide means for use with conventional hand operated container valves to adapt them for use with a pressure regulator.

Figure 1:
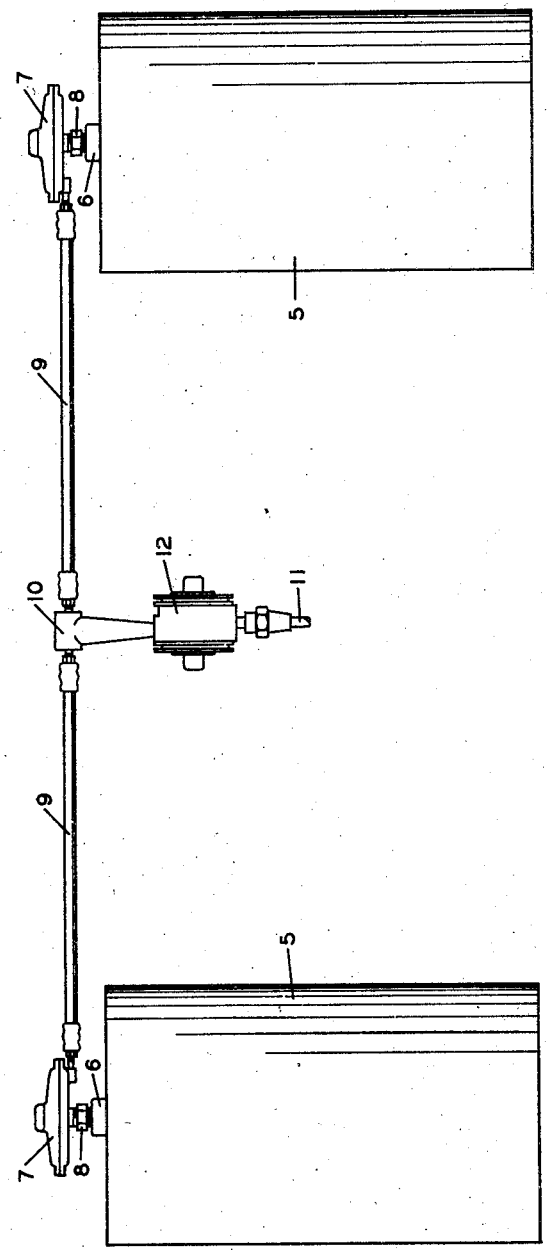
Figure 1 is an elevation view showing a typical installation of containers and pressure regulators for the utilization of liquefied fuel gases.
Figure 2:
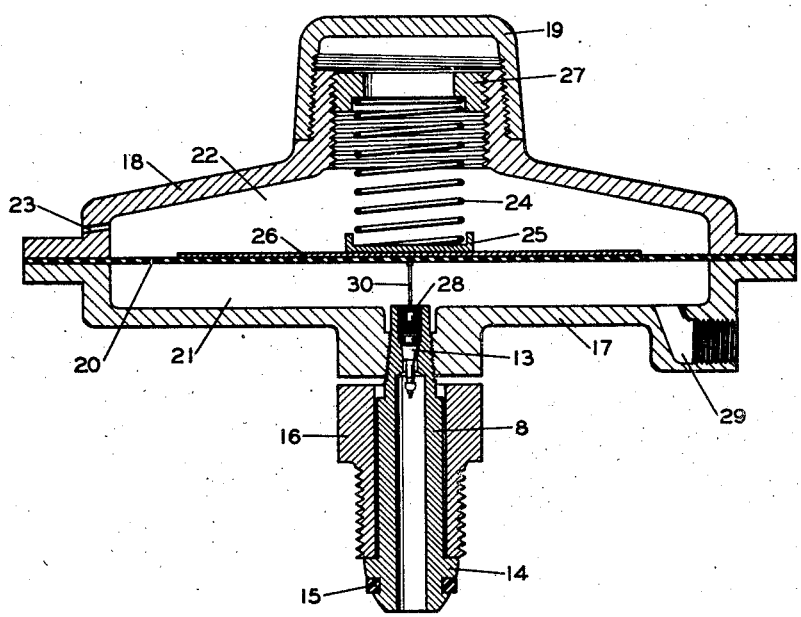
Figure 2 is a longitudinal section of one form of adapter showing its relationship to other parts.

Referring to Figures 1 and 2 of the drawings, the numeral 5 designates high pressure or liquefied gas containers from which gas is to be dispensed. Each container is equipped with an outlet valve 6 through which gas may be withdrawn. A gas pressure regulator 7 is connected to the outlet valve by an adapter 8. Flexible conduit 9 connects the gas pressure regulator to a manifold 10. The customer's service line 11, a portion of which is shown, communicates with various appliances in which the gas is to be used. Interposed between the manifold 10 and the customer's service line 11 is a second stage pressure regulator 12 of any suitable conventional type. Gas withdrawn from the container through the outlet valve 6 passes through adapter 8 into pressure regulator 7 which is so constructed as to maintain a constant discharge pressure. From regulator 7 the gas flows through flexible conduit 9, manifold 10 and regulator 12 in which its pressure is further reduced; and finally through the service line 11 to the various appliances. While the system outlined above includes a pair of liquefied gas containers, it should be borne in mind that this invention is not restricted to the use of any particular number of such containers; but, instead, one or any number of containers may be employed in the system, as desired. Also, although two stage pressure regulation is preferred in the usual installation, it is to be understood that the instant invention operates to perform the intended functions whether or not second stage regulator 12 is included in the system.

Adapter 8 is in the form of a conduit or tubular member drilled on several diameters and tapped to contain a valve 13, preferably of the tire valve core type. The end adjacent to valve 13 is externally threaded and the opposite end is provided with a shoulder 14 and gasket 15. Concentric with adapter 8 is a sleeve or connector 16, the lower portion of which is externally threaded to engage an internally threaded portion of outlet valve 6. Outlet valve 6 may be of any suitable type, such as one of the conventional hand operated valves being used on similar containers at the present time. Shoulder 14, gasket 15, and connector 16 are so constructed as to form a gas tight seal between the outlet valve 6 and shoulder 14 when connector 16 is screwed into place.

A diaphragm motor housing, consisting of a base 17, a top 18 and a cover 19, is divided by a flexible diaphragm 20 into two compartments, namely, a fluid compartment 21 and a spring compartment 22, the latter compartment communicating with the atmosphere through a vent opening 23 in top 18. A spring 24, for urging the diaphragm downwardly, is positioned in the spring compartment so that its lower portion extends into a cup-shaped guide 25 which is disposed on a diaphragm plate 26 and the upper portion abuts an adjusting nut 27 which is in threaded engagement with the housing top 18.

The pressure exerted by spring 24 may be readily adjusted by simply removing cover 19 and turning nut 27 to thereby increase or decrease the spring load, as desired. Fluid compartment 21 is provided with a fluid inlet 28, and a fluid outlet 29 which is in communication with flexible conduit 9. Diaphragm 20 acts directly upon stem 30 of valve 13 to actuate the valve.

In operation, shoulder 14 and the threaded portion of connector 16 are inserted into the outlet of valve 6 and connector 16 is screwed into place, forcing gasket 15 into sealing relationship with the valve. The valve 6 is then opened manually or otherwise, depending upon the type valve employed, to allow gas from container 5 to pass through the interior of adapter 8; through valve 13, which is held open by the action of spring 24 and diaphragm 20 on valve stem 30; and into fluid compartment 21 through inlet 28. From the fluid compartment, the gas passes through outlet 29, flexible conduit 9, manifold 10, and regulator 12 to the customer's service line 11 from which it is distributed to the various appliances. As the gas enters the fluid compartment, it tends to build up a pressure therein which acts on diaphragm 20 urging it in an upward direction against the action of spring 24. When the gas in compartment 21 reaches a predetermined pressure, diaphragm 20 moves upwardly against the action of spring 24, thereby releasing valve stem 30 and allowing valve 13 to close. Thus, it is apparent that my invention, in combination with a diaphragm motor, acts as a pressure regulator to control the pressure of the fluid in flexible conduit 9 and manifold 10. If the customer's appliances require a constant supply of gas, diaphragm 20 assumes an intermediate position, causing valve 13 to be held partially open. As the high pressure gas passes through the partly opened valve 13, its pressure is reduced by throttling action of the valve to the pressure it is desired to maintain in fluid compartment 21.

Figure 3:
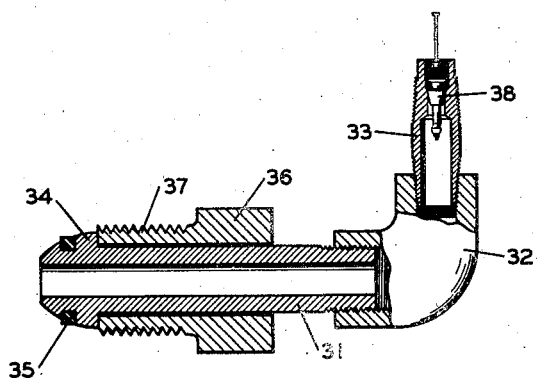
Figure 3 is a longitudinal section of a modification of the adapter employed in this invention.

The form of the invention illustrated in Figure 3 is for use with container valves having an outlet at an angle of 90° from the vertical. In this embodiment the adapter comprises a tubular member 31, an elbow 32 and a valve body member 33. Tubular member 31 is externally threaded at one end and is provided with a shoulder 34 and gasket 35 at its opposite end. Concentric with tubular member 31 is a connector 36 having an externally threaded portion 37 to engage the internally threaded portion of the container outlet valve. Elbow 32 may be a standard pipe elbow of 90°, greater or less, depending upon the outlet angle of the cylinder valve. Valve body member 33 is externally threaded at each end, bored on several diameters and tapped to contain a valve 38 of the tire valve core type. The operation of this form of the adapter is the same as the operation of the adapter shown in Figure 2, the shoulder 34 being inserted into the container valve, and the diaphragm motor being carried by valve body member 33. It will be obvious that this embodiment of the invention is merely illustrative of the flexibility of arrangement which may be obtained by the practice of this invention, since the regulator can thus be placed in any desired position relative to the cylinder or the cylinder valve.

While I have herein disclosed two forms of my invention, it is to be understood that various changes in the size, shape, and relative position of parts may be resorted to without departing from the spirit of my invention, as set forth in the appended claims.

I claim:

1. In a system for storing and dispensing liquefied petroleum gases and the like, a container for the gas; a gas pressure regulator comprising a housing, a flexible diaphragm positioned within the housing and forming two compartments therein, one of said compartments containing a spring adjustably mounted and in contact with the diaphragm, said compartment having a relief passage open to the atmosphere whereby pressure on the spring side of the diaphragm is vented, the second of said compartments having a gas inlet passage and outlet passage communicating therewith, said gas inlet passage having a tubular conduit removably connected thereto adapted to make a substantially pressure tight sealing engagement between the container and the regulator, said conduit having a valve positioned in one end thereof cooperating with the diaphragm and thereby openable against the pressure within the container; and a flexible service conduit communicating with the outlet passage in said regulator for conveying gas at reduced pressure to gas consuming appliances.

2. In a system for storing and dispensing liquefied petroleum gases having a plurality of containers with gas under pressure therein, a flexible conduit for conveying gas to gas consuming appliances, and pressure reducing means attached to each container whereby said gas pressure is reduced before said gas enters the flexible conduit; the improvement in said means comprising, a housing divided by a flexible diaphragm positioned therein to form two compartments; one of said compartments containing a spring adjustably mounted and in contact with the diaphragm, said compartment having a passage therein open to the atmosphere whereby pressure on the spring side of the diaphragm is vented; the other of the compartments having a gas inlet and outlet passage communicating therewith; said gas inlet having an adapter removably connected thereto for connecting a gas container and the pressure reducing means in a fluid tight engagement; the adapter comprising a tubular conduit for the passage of gas, a valve positioned in one end thereof and having a stem projecting therefrom against the diaphragm, the opposite end of the conduit having an annular shoulder and a gasket set therein, and a sleeve member concentrically mounted around the conduit engaging the shoulder and held in position thereby, said sleeve having one end thereof externally threaded to engage with the container.

3. In a gas dispensing system of the class described including a tank of fuel under pressure with a manually-operated valve forming a closure therefor and a low-pressure conduit associated with a diaphragm motor element, a unitary means for adapting said motor element to said manual valve comprised of: a tubular conduit; means at the inlet end of said conduit establishing communication with said manual valve; means at the outlet end of said conduit establishing communication with said diaphragm motor element; a reciprocable valve in the outlet end of said conduit for varying the flow-way therethrough; and an operating element on said valve rendering the valve operable by said diaphragm motor.

4. In a gas dispensing system of the class described including a tank of fuel under pressure with a manually-operated valve forming a closure therefor and a low-pressure conduit associated with a diaphragm motor element, a unitary means for adapting said motor element to said manual valve comprised of: a tubular conduit; a reciprocable valve in said conduit for varying the flow-way therethrough; and an operating element on said valve extending through the conduit from the valve into engagement with the diaphragm motor element to render the valve operable by said diaphragm motor.

5. In a system for storing and dispensing liquefied petroleum gases and the like, a container for the gas; a gas pressure regulator comprising a housing, a flexible diaphragm positioned within the housing and forming two compartments therein, one of said compartments containing a spring adjustably mounted and in contact with the diaphragm, said compartment having a relief passage open to the atmosphere whereby pressure on the spring side of the diaphragm is vented, the second of said compartments having a gas inlet passage and outlet passage communicating therewith, said gas inlet passage having a tubular conduit removably connected thereto at one end forming an adapter, the opposite end being designed to make a substantially tight seat engagement between the container and the regulator, said conduit having a valve positioned therein, an operating element on said valve and extending from said valve into engagement with the diaphragm adapted to be openable against the pressure within the container.

ROSSWELL W. THOMAS.